United States Patent
Kabeya (10) Patent No.: US 12,331,436 B2
(45) Date of Patent: Jun. 17, 2025

(54) AIRBAG PATCH CLOTH

(71) Applicant: Asahi Kasei Kabushiki Kaisha, Tokyo (JP)

(72) Inventor: Takumi Kabeya, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 369 days.

(21) Appl. No.: 18/010,777

(22) PCT Filed: Jun. 16, 2021

(86) PCT No.: PCT/JP2021/022882
§ 371 (c)(1),
(2) Date: Dec. 15, 2022

(87) PCT Pub. No.: WO2021/256510
PCT Pub. Date: Dec. 23, 2021

(65) Prior Publication Data
US 2023/0228008 A1 Jul. 20, 2023

(30) Foreign Application Priority Data
Jun. 16, 2020 (JP) ................................ 2020-103692

(51) Int. Cl.
*D03D 1/02* (2006.01)
*D03D 13/00* (2006.01)
*D03D 15/283* (2021.01)

(52) U.S. Cl.
CPC ............ *D03D 1/02* (2013.01); *D03D 13/008* (2013.01); *D03D 15/283* (2021.01);
(Continued)

(58) Field of Classification Search
None
See application file for complete search history.

(56) References Cited

U.S. PATENT DOCUMENTS

| 4,921,735 A | 5/1990 | Bloch |
| 2010/0048079 A1 | 2/2010 | Fujiyama et al. |

(Continued)

FOREIGN PATENT DOCUMENTS

| JP | H03-122952 A | 12/1991 |
| JP | H06-156173 A | 6/1994 |

(Continued)

OTHER PUBLICATIONS

Supplementary European Search Report issued in European Patent Application No. 21825910.9 dated Oct. 31, 2023.
(Continued)

*Primary Examiner* — Arti Singh-Pandey
(74) *Attorney, Agent, or Firm* — Morgan, Lewis & Bockius LLP (57) ABSTRACT

The present disclosure provides an airbag patch cloth that has superior packability and cutting resistance upon deployment of the airbag, and which is particularly suitable for a curtain airbag. The airbag patch cloth is a woven fabric which satisfies the following equations: $P_x=E/(T_x \times F_x) \times 1000$, $P_y=E/(T_y \times F_y) \times 1000$, wherein E indicates the kinetic energy (J) of a block and a blade. In the equations, $T_x$ indicates the average value (mm) of a torn length in the warp direction, $F_x$ indicates the linear density (dtex) of the warp constituting the fabric, $T_y$ indicates the average value (mm) of a torn length in the weft direction, and $F_y$ indicates the linear density (dtex) of the weft constituting the fabric. At least one of dynamic tear characteristics $P_x$ and $P_y$ is greater than or equal to 0.8.

13 Claims, 1 Drawing Sheet

(52) U.S. Cl.
CPC .... *D10B 2331/02* (2013.01); *D10B 2401/063* (2013.01); *D10B 2505/124* (2013.01)

(56) References Cited

U.S. PATENT DOCUMENTS

| | | |
|---|---|---|
| 2011/0036447 A1 | 2/2011 | Horiguchi et al. |
| 2020/0001817 A1 | 1/2020 | Takeshita et al. |

FOREIGN PATENT DOCUMENTS

| | | |
|---|---|---|
| JP | 2001-277970 A | 10/2001 |
| JP | 2004-522003 A | 7/2004 |
| JP | 2004-339640 A | 12/2004 |
| JP | 2006-062590 A | 3/2006 |
| JP | 2006-160102 A | 6/2006 |
| JP | 2008-025089 A | 2/2008 |
| JP | 2009-243030 A | 10/2009 |
| JP | 2011-240789 A | 12/2011 |
| JP | 2013-189744 A | 9/2013 |
| KR | 10-0792423 B1 | 1/2008 |
| WO | 02/18180 A2 | 3/2002 |
| WO | 2018/042728 A1 | 3/2018 |

OTHER PUBLICATIONS

International Search Report issued in corresponding International Patent Application No. PCT/JP2021/022882 dated Aug. 24, 2021.
International Preliminary Report on Patentability and Written Opinion issued in corresponding International Patent Application No. PCT/JP2021/022882 dated Dec. 29, 2022.

AIRBAG PATCH CLOTH

FIELD

The present disclosure relates to a patch cloth for attachment to a body cloth of an airbag, which is one type of safety device for vehicles such as automobiles, and in particular, relates to a patch cloth which is suitable for attachment to the body cloth of a curtain airbag.

BACKGROUND

In recent years, from the viewpoint of improving the safety of occupants in vehicles such as automobiles, the installation rate of in-vehicle airbags has been increasing. A typical automobile airbag is composed of a sensor which detects a collision, a gas generator (inflator), and a cushion. When the sensor detects a collision, the inflator is activated, and the generated gas instantly inflates (deploys) the cushion, protecting the occupants from impact.

As such automobile airbags, in addition to driver-side airbags and passenger-side airbags, which are installed in front of the driver's seat and passenger's seat, respectively, to protect the occupants from the impact of frontal vehicle collisions, side airbags, which primarily protect the occupants from the impact of vehicle side collisions, and various airbags according to the type of collision and the position of the occupant, such as a knee airbags, which protect the legs of the occupants, have been developed.

Curtain airbags, which protect occupants mainly from side collisions, are stored, for example, in the area from the front pillar side to the rear pillar side along the roof rail of an automobile, and are designed to expand and deploy like a curtain along the side glass when a collision is detected. Curtain airbags, when deployed, are required to instantly enter between the head of the occupant and the glass to protect the head, and in order to suppress not only the primary impact (first impact) due to a collision, but also impact caused by vehicle body inversion (rollover) and to prevent the occupants from being ejected from the vehicle, there is a growing demand for a cushion which has a shape and deployment behavior wherein the cushion does not undergo large decreases in internal pressure and which has a protective range covering the side glass.

Such a curtain airbag is folded into, for example, a roll shape or a bellows shape when stored, and then secured with a base cloth or tape. In order to maintain a large interior space while meeting the above requirements, it is extremely important that curtain airbags have excellent packability (compactness).

During deployment of a curtain airbag, when the airbag is deployed in one direction at a high speed, there is a problem that the cushion surface interferes with the side glass or an obstacle inside or outside the vehicle body and a unidirectional tear mode cut occurs on the surface of the airbag body cloth. If such a cut occurs, the ability of the cushion to retain internal pressure is inhibited, whereby the reaction force characteristics of the airbag are significantly reduced, possibly impairing the required shock absorption performance of the airbag.

Patent Literature 1 (Korean Patent No. 10-0792423) describes a method for obtaining a curtain airbag which has a function of protecting the head of an occupant in the event of a side collision, wherein by attaching a protector to the outside of the curtain airbag cushion, during the deployment of the protective cushion, door glass fragments and sharp fragments of the vehicle body and trim are prevented from directly contacting the protective cushion, thereby protecting the cushion. However, since this method requires affixing both the body cloth and the protector of the curtain airbag to the vehicle body, there is a problem in that the packability of the entire airbag is reduced, whereby the efficiency of production of the airbag and attachment thereof to the vehicle body is reduced.

Patent Literature 2 (Japanese Unexamined PCT Publication (Kohyo) No. 2004-522003) describes a method for obtaining a cloth adapted for use in curtain airbags, wherein the cloth is provided on the exterior surface thereof with at least one coating, film, cloth, or layer to have excellent abrasion resistance, puncture resistance, and combinations thereof. However, the dynamic tear mode, which is the most important mode of cut caused when the airbag is deployed at a high speed in one direction during the deployment of the curtain airbag, has not been investigated. Furthermore, methods of arranging a covering or film of a polyurethane elastomer on the surface of the airbag body cloth increase the hardness of the cushion body cloth, possibly resulting in a decrease in packability and deployment speed. Though an aspect in which a cloth layer is arranged close to the cushion body cloth is shown, the physical properties and structure of the cloth layer have not been examined.

Patent Literature 3 (Japanese Unexamined Patent Publication (Kokai) No. 2006-62590) describes a method wherein a cover material is applied to a cushion surface, and by designing so that strength against penetration of the pushing blade as measured using the constant speed elongation burst tester described in JIS L-1096 (8.16.2 method B) is 5 N or more, the airbag can be protected from cuts and the impact on the occupants can be absorbed without damage or breakage. In one aspect of this method, a woven fabric composed of high-strength fibers of, for example, aromatic polyamide is sewn to the base cloth of the airbag body to increase the strength against penetration of the pushing blade. However, the damage mode due to the pushing blade as measured using the constant speed elongation type burst tester described in JIS L-1096 (8.16.2 B method) is a relatively low-speed piercing mode, and the dynamic tear mode, which is the most important mode of cut caused when the airbag is deployed at a high speed in one direction during deployment of the curtain airbag, has not been investigated. Furthermore, methods of applying a cut-resistant material may increase the hardness of the cushion body cloth, possibly resulting in reduction in packability. Compatibility between cut resistance and curtain airbag packability is not described for any of the aspects.

CITATION LIST

Patent Literature

[PTL 1] Korean Patent No. 10-0792423
[PTL 2] Japanese Unexamined PCT Publication (Kohyo) No. 2004-522003
[PTL 3] Japanese Unexamined Patent Publication (Kokai) No. 2006-62590

SUMMARY

Technical Problem

The present disclosure has been conceived in light of such problems of the prior art described above, and aims to provide an airbag patch cloth having excellent packability and excellent cut resistance when the airbag is deployed.

Solution to Problem

Examples of embodiments of the present disclosure are listed in items [1] to [13] below.

[1]

An airbag patch cloth for attachment to a body cloth of an airbag, wherein
the airbag patch cloth is a woven fabric, and
in the woven fabric, at least one of dynamic tear properties $P_x$ and $P_y$ represented by the following formulas is 0.8 or more:

$$P_x = E/(T_x \times F_x) \times 1000$$

$$P_y = E/(T_y \times F_y) \times 1000$$

where E is a kinetic energy (J) of a block and blade in the dynamic tear test (performance standard level 3) described in JIS T 8050, $T_x$ is an average value (mm) of a warp direction tear length in the dynamic tear test (performance standard level 3) described in JIS T 8050, $F_x$ is a fineness (dtex) of a warp constituting the woven fabric, $T_y$ is an average value (mm) of a weft direction tear length in the dynamic tear test (performance standard level 3) described in JIS T 8050, and $F_y$ is a fineness (dtex) of a weft constituting the woven fabric.

[2]

The airbag patch cloth according to Item 1, wherein a ratio of $T_x$ and $T_y$ of the airbag patch cloth when the smaller of $T_x$ and $T_y$ is divided by the larger is 0.94 or less.

[3]

The airbag patch cloth according to Item 1 or 2, wherein in the airbag patch cloth, a ratio of a warp cover factor $CF_x$ and a weft cover factor $CF_y$ represented by the following formulas, when the smaller of $CF_x$ and $CF_y$ is divided by the larger, is 0.30 to 0.80:

$$CF_x = (D_x \times \sqrt{F_x})$$

$$CF_y = (D_y \times \sqrt{F_y})$$

where $D_x$ is a warp yarn number (warp yarn density) per 2.54 cm, $F_x$ is a fineness (dtex) of the warp constituting the woven fabric, $D_y$ is a weft yarn number (weft yarn density) per 2.54 cm, and $F_y$ is a fineness (dtex) of the weft constituting the woven fabric.

[4]

The airbag patch cloth according to any one of Items 1 to 3, wherein a sum of a warp cover factor $CF_x$ and a weft cover factor $CF_y$ of the airbag patch cloth is 1500 to 2200.

[5]

The airbag patch cloth according to any one of Items 1 to 4, wherein a total fineness of warp and weft yarns constituting the airbag patch cloth is 210 dtex to 550 dtex.

[6]

The airbag patch cloth according to any one of Items 1 to 5, wherein an edge-comb resistance of the airbag patch cloth is 10 N to 400 N for both warp and weft.

[7]

The airbag patch cloth according to any one of Items 1 to 6, wherein a basis weight of the airbag patch cloth is 220 g/m² or less.

[8]

The airbag patch cloth according to any one of Items 1 to 7, wherein a warp-weft ratio of tear strength of the airbag patch cloth is 0.94 or less when the smaller of the warp direction tear strength and the weft direction tear strength is divided by the larger.

[9]

The airbag patch cloth according to any one of Items 1 to 8, wherein a warp and/or weft direction tear strength of the airbag patch cloth is 100 N or more.

[10]

The airbag patch cloth according to any one of Items 1 to 9, wherein a warp and/or weft direction bending resistance of the airbag patch cloth is 10 N or less.

[11]

The airbag patch cloth according to any one of Items 1 to 10, wherein a warp and/or weft direction tensile elongation of the airbag patch cloth is 10% or more.

[12]

An airbag, to which the airbag patch cloth according to any one of Items 1 to 11 is attached so as to cover at least a part of an airbag body cloth.

[13]

The airbag according to Item 12, wherein the airbag patch cloth is attached so that the warp or weft direction of the airbag patch cloth, whichever has the smaller cover factor, is parallel to a deployment direction of the airbag.

Advantageous Effects of Invention

According to the present disclosure, there is provided an airbag patch cloth having excellent packability and excellent cut resistance when the airbag is deployed.

DESCRIPTION OF EMBODIMENTS

The embodiments of the present disclosure will be described in detail below. The present disclosure is not limited to the following embodiments, and various changes can be made within the scope of the spirit thereof.

As used herein, the phrase "patch cloth" refers to a woven fabric which is attached to the body cloth of an airbag. A "body cloth" is a bag-like structure that expands with gas generated by an inflator, and a structure of a combination of two or more fabric cloths or a structure of a bag-like woven fabric referred to as OPW can be used. Being attached to the body cloth of the airbag refers to the state of being directly or indirectly connected to the airbag body cloth, or being housed together with the airbag body cloth.

In the airbag patch cloth of the present disclosure, the warp and weft yarns constituting the airbag woven fabric are composed of, preferably, but not limited to, the same material as the airbag body cloth from an economic point of view. For example, polyamide fibers, polyester fibers, vinylon fibers, high-strength polyethylene, polypropylene, and other polyolefin fibers, vinyl chloride and vinylidene chloride fibers, polytetrafluoroethylene and other fluorine fibers, polysulfone fibers, polyphenylene sulfide-based fibers (PPS), polyetherketone-based (PEEK) fibers, polyalkylketone fibers, polyimide fibers, polyetherimide fibers, high-strength rayon and other cellulosic fibers, acrylic fibers, carbon fibers, glass fibers, silicon carbide (SiC) fibers, and alumina fibers can be used alone or in combination. Synthetic fibers are preferable from the standpoint of strength and elongation and economics, and polyamide fibers and polyester fibers are preferable.

Both the warp and weft yarns constituting the patch cloth preferably have a total fineness of 100 dtex to 750 dtex, more preferably 150 dtex to 550 dtex, further preferably 180 dtex to 550 dtex, even further preferably 210 dtex to 550 dtex, and particularly preferably 210 dtex to 370 dtex. Warp and weft yarns different in total finesses may be used. By setting the total fineness to 100 dtex or more, resistance to strong force during deployment and expansion is imparted thereto. Conversely, by setting the total fineness to 750 dtex or less, the woven fabric becomes flexible, whereby packability improves and high-speed deployment becomes possible.

The cross-sectional shapes of the warp and weft yarns are not particularly limited, and they may be circular, triangular, hexagonal, flat or irregular cross-section yarns, and a circular cross-section is preferable from the viewpoint of maximizing strength and elongation.

The weight (basis weight) of the patch cloth is preferably 220 g/m$^2$ or less, more preferably 200 g/m$^2$ or less, and further preferably 180 g/m$^2$ or less. By setting the basis weight to 220 g/m$^2$ or less, the airbag becomes lighter and packability can also be improved. Though the lower limit of the basis weight of the patch cloth is not limited, it may be 50 g/m$^2$ or more.

The thickness of the patch cloth is preferably 0.3 mm or less, more preferably 0.25 mm or less, and further preferably 0.2 mm or less. By setting the thickness of the patch cloth to 0.3 mm or less, the packability of the airbag can be improved. From the viewpoint of cut resistance, the thickness of the patch cloth is preferably 0.1 mm or more, and more preferably 0.15 mm or more.

In the patch cloth, the sum CF of the warp cover factor $CF_x$ and the weft cover factor $CF_y$ is preferably 1500 to 2200. $CF_x$ and $CF_y$ are represented by the following formulas:

$$CF_x = (D_x \times \sqrt{F_x})$$

$$CF_y = (D_y \times \sqrt{F_y})$$

where $D_x$ is a warp yarn number (warp yarn density) per 2.54 cm, $F_x$ is a fineness (dtex) of the warp constituting the woven fabric, $D_y$ is a weft yarn number (weft yarn density) per 2.54 cm, and $F_y$ is a fineness (dtex) of the weft constituting the woven fabric. By setting the sum CF of $CF_x$ and $CF_y$ to 2200 or less, an airbag having excellent cut resistance and excellent packability during airbag deployment can be obtained. Conversely, by setting CF to 1500 or more, the weave can be made dense to some extent, and the weave can be prevented from shifting and becoming uneven during cutting or sewing. Furthermore, the slippage of the woven fabric structure can be prevented from destroying the connection between the patch cloth and the airbag body when tension is applied to the patch cloth during airbag deployment and force is thus applied to the connection between the patch cloth and the airbag body. CF is more preferably 1600 to 1950, and further preferably 1800 to 1900.

The patch cloth preferably has a ratio of warp and weft cover factors $CF_x$ and $CF_y$ (warp-weft ratio) of 0.80 or less. Note that the ratio of warp and weft cover factors $CF_x$ and $CF_y$ is calculated by dividing the smaller of $CF_x$ and $CF_y$ by the larger. In order for the ratio of warp and weft cover factors $CF_x$ and $CF_y$ to be 0.80 or less, it is necessary to design so that one of $CF_x$ and $CF_y$ is smaller than the other. Either $CF_x$ or $CF_y$ may be smaller, but from the viewpoint of the dimensional stability of the base cloth, it is preferable to design so that $CF_y$ is smaller. By reducing the weft yarn density, the difference in crimp rate between warp and weft yarns can be reduced, whereby the difference between warp and weft dimensional changes can be reduced. By attaching a patch cloth having a ratio of warp and weft cover factors $CF_x$ and $CF_y$ of 0.80 or less to the airbag body cloth, an airbag having excellent cut resistance and excellent packability during airbag deployment can be obtained.

During the deployment of a curtain airbag, the cushion surface interferes with the side glass or an obstacle inside or outside the vehicle body, and cuts are likely to occur in the deployment direction (i.e., the vertical direction) of the curtain airbag. When a patch cloth is connected to curtain-shaped airbag body cloth to obtain a curtain airbag having excellent cut resistance during deployment, by increasing the cover factor in the direction perpendicular to the cut direction, the amount of fibers present per unit length of the cut can be increased and the energy absorption by fiber breakage can be increased. Furthermore, by reducing the cover factor in the direction parallel to the cut direction, yarn shift of the fibers in the direction perpendicular to the cut direction is more likely to occur, and energy absorption at break per fiber in the direction perpendicular to the cut direction can be increased. Further, by reducing the cover factor in the direction parallel to the direction of the cut relative to the cover factor in the direction perpendicular to the direction of the cut, the cut energy can be dissipated in a direction perpendicular to the direction of the cut to improve cut resistance. By reducing the ratio of $CF_x$ and $CF_y$, the yarn shift of the fiber is likely to occur, whereby bending resistance is lowered, and airbag packability can be enhanced. Curtain airbags are generally folded into a roll shape or a bellows shape when stored, and at this time, bending deformation is applied to the yarns in the direction parallel to the direction of the cut. By reducing the cover factor in the direction parallel to the direction of the cut, the resistance to bending deformation can be reduced and the packability can be improved, which is preferable. The ratio of warp and weft cover factors $CF_x$ and $CF_y$ is preferably 0.75 or less, and more preferably 0.70 or less. Conversely, from the viewpoint of handleability, the ratio of warp and weft cover factors $CF_x$ and $CF_y$ is preferably 0.30 or more, more preferably 0.50 or more, and further preferably 0.60 or more. In order to bring about the effects described above, the range of the larger absolute value of the warp and weft cover factors $CF_x$ and $CF_y$ of the patch cloth is preferably 900 to 1300, more preferably 950 to 1250, and further preferably 1000 to 1200. Conversely, in order to bring about the effects described above, the range of the smaller absolute value of the warp and weft cover factors $CF_x$ and $CF_y$ of the patch cloth is preferably 300 to 1200, more preferably 400 to 1100, and further preferably 500 to 1000.

When the patch cloth is attached to a curtain-like airbag body cloth, it is preferable to attach the patch cloth so that the warp or weft direction thereof, whichever has the smaller cover factor, is parallel to the deployment direction of the airbag to improve cut resistance. By arranging the patch cloth so that the warp or weft direction thereof, whichever has the smaller cover factor, is parallel to the deployment direction of the airbag, the energy absorption efficiency described above can be enhanced. Conversely, by attaching the patch cloth so that the warp or weft direction thereof, whichever has the larger cover factor, is parallel to the deployment direction of the airbag, when a cut occurs on the patch cloth, the patch cloth wrinkles near the cut and creates a gap between it and the body cloth, which may protect the body cloth from the cut. Furthermore, the patch cloth can be arranged in a bias direction with respect to the deployment direction. In a state in which the patch cloth is attached to the airbag body cloth, the presence or absence of connection with the airbag body cloth and the method of connection are not particularly limited, and for example, the airbag body cloth and patch cloth can be sewn together, connected with a string or strip-shaped material, or stored together with the airbag body cloth so that they are pushed out by the deployment behavior of the airbag body cloth. It is important to design the patch cloth so that at the timing when the airbag body cloth interferes with an obstacle inside or outside the vehicle body during deployment of the airbag, the patch cloth is present between the airbag body cloth and the obstacle. By doing so, the function of reducing the danger of cuts to the airbag body cloth caused by obstacles can be exhibited. Furthermore, the shape of the patch cloth is not particularly limited, and it is preferable to design the airbag body cloth in consideration of the effect of cut resistance and packability.

When the patch cloth is connected to the curtain-shaped airbag body cloth, a curtain airbag having superior packability can be achieved by attaching the patch cloth so that the warp or weft direction thereof, whichever has the smaller cover factor, is parallel to the deployment direction of the airbag. This is because the resistance to bending deformation can be reduced by reducing the cover factor in the vertical direction, where deformation is applied when the curtain airbag is wound or folded.

The patch cloth is characterized in that at least one of dynamic tear properties $P_x$ and $P_y$ described below is 0.8 or more. The larger of $P_x$ and $P_y$ may be 0.8 or more, and the smaller may be 0.8 or less. The value of at least one of $P_x$ and $P_y$ is preferably 0.85 or more, and more preferably 0.9 or more. Though the upper limits of $P_x$ and $P_y$ are not particularly limited, they are 20 or less in consideration of production from flexible and available materials which are suitable for airbag patch cloths.

The values of the dynamic tear properties P are calculated from the results of the material puncture and dynamic tear resistance tests described in JIS T 8050. Specifically, they are represented by the following formulas:

$$P_x = E/(T_x \times F_x) \times 1000$$

$$P_y = E/(T_y \times F_y) \times 1000$$

where E is the kinetic energy (J) of the block and blade in the dynamic tear test (performance standard level 3) described in JIS T 8050, $T_x$ is an average value (mm) of a warp direction tear length in the dynamic tear test (performance standard level 3) described in JIS T 8050, $F_x$ is a fineness (dtex) of the warp constituting the patch cloth, $T_y$ is an average value (mm) of a weft direction tear length in the dynamic tear test (performance standard level 3) described in JIS T 8050, and $F_y$ is a fineness (dtex) of the weft constituting the patch cloth.

$T_x$ and $T_y$ are average values (mm) of warp direction and weft direction tear lengths, respectively in the dynamic tear test described in JIS T8050. However, the mass of the blade-holding block and the blade used is 1000 g, and the kinetic energy of the block and blade calculated from the average velocity when the block is dropped five times in succession is adjusted to 6.6 J to 7.0 J. Specifically, the test conditions are for evaluating the performance at performance standard level 3 described in JIS T 8050. Furthermore, in the measurements of the warp direction and weft direction tear lengths, at least three test samples are tested in each direction, and the average tear length in each direction is calculated. E is the block and blade kinetic energy (J) calculated from the average velocity, and is a value in the range of 6.6 J to 7.0 J.

In the dynamic tear test, a tearing blade capable of puncturing the sample is dropped onto the sample, causing a blunt tear to the sample. At that time, a dynamic piercing mode and a tearing mode are imparted to the sample in one direction. These damage modes are similar to the modes of cuts that occur when the cushion surface interferes with the side glass or an obstacle inside or outside the vehicle body during the deployment of the curtain airbag.

Since the damage mode in the dynamic tear test is similar to the cut mode during curtain airbag deployment, in the patch cloth, the fineness $F_x$ and/or $F_y$ is small, the tear length $T_x$ and/or $T_y$ is small, and the values of dynamic tear properties P are high, whereby there can be obtained a patch cloth which has excellent packability, and which can prevent the deterioration of the internal pressure retention performance of the cushion due to cuts and can maintain the shock absorption performance required for airbags even if the curtain airbag interferes with the side glass or an obstacle inside or outside the vehicle during deployment.

The value of $T_x$ or $T_y$ of the patch cloth is preferably 40 mm or less, more preferably 30 mm or less, and further preferably 20 mm or less. By setting the value of $T_x$ or $T_y$ to 40 mm or less, resistance to cuts by glass fragments during airbag deployment can be enhanced. Though the lower limits of $T_x$ and $T_y$ are not particularly limited, they may be 5 mm or more in consideration of production from flexible and available materials suitable for airbag patch cloths.

The ratio of $T_x$ and $T_y$ (the smaller of $T_x$ and $T_y$ is divided by the larger) of the patch cloth, from the viewpoint of cut resistance, is preferably 0.94 or less, more preferably 0.9 or less, and further preferably 0.8 or less. By setting the ratio of $T_x$ and $T_y$ to 0.94 or less, i.e., by imparting anisotropy to the warp direction and weft direction tear lengths in the dynamic tear test of the patch cloth, cut energy can be dissipated in a direction and cut resistance can be improved. Though the lower limit of the ratio of $T_x$ and $T_y$ is not limited, it may be 0.2 or more.

The warp and/or weft tear strength of the patch cloth is preferably 100 N or more, more preferably 150 N or more, and further preferably 200 N or more. By setting the tear strength value in the warp and/or weft direction to 100 N or more, the resistance to cuts caused by glass fragments during airbag deployment can be enhanced. Though the upper limit of the tear strength is not limited, it may be 1000 N or less in consideration of production from flexible and available materials suitable for airbag patch cloths.

The tear strength warp-weft ratio (the smaller is divided by the larger) of the patch cloth is preferably 0.94 or less, more preferably 0.9 or less, and further preferably 0.87 or less. By setting the tear strength warp-weft ratio to 0.94 or less, the tear strength in the warp direction and weft direction of the patch cloth has anisotropy, whereby the cut energy can be dissipated in the direction where the tear strength is lower, improving cut resistance in the cut direction. Though the lower limit of the tear strength warp-weft ratio is not limited, it may be 0.2 or more.

The warp and/or weft direction bending resistance of the patch cloth is preferably 10 N or less, more preferably both the warp and weft direction bending resistances are 10 N or less, and further preferably both the warp and weft direction bending resistances are 8 N or less. By setting the bending resistance to 10 N or less, the packability of the airbag can be improved. Though the lower limit of bending resistance is not limited, it is 1 N or more in consideration of production from commonly available materials.

The edge-comb resistance of the patch cloth is preferably 10 N to 400 N for both the warp and the weft. By setting the edge-comb resistance to 10 N or more, destruction of the connection between the patch cloth and the airbag body due to slippage of the woven fabric structure can be prevented when tension is applied to the patch cloth during airbag deployment and the force is thus applied to the connection part between the patch cloth and the airbag body. The edge-comb resistance of patch cloth can be increased by increasing the cover factor and by removing oil on the fabric. Conversely, by setting the edge-comb resistance to 400 N or less, yarn shift of the fibers is likely to occur, whereby the cutting energy can be dissipated, and the cut resistance can be improved. In order to achieve both connection stability between the patch cloth and the airbag body and cut resistance, for example, it is possible to moderately remove oil adhering to the fibers by washing the woven patch cloth with water. It is more preferable that the edge-comb resistance of the patch cloth be 30 N to 300 N.

The warp and/or weft direction tensile elongation of the patch cloth is preferably 10% or more. By setting the tensile elongation to 10% or more, it is possible to prevent expansion of the airbag body base cloth from being inhibited by the patch cloth attached during the deployment of the airbag, and the destabilization of the deployment behavior of the airbag and/or the decrease in the deployment speed. Further, tension is unlikely to apply to the patch cloth when the airbag is deployed, and the connection between the patch cloth and the airbag body is unlikely to be broken due to slippage of the woven fabric structure. The tensile elongation is more preferably 20% or more, and further preferably 25% or more. From the viewpoint of cut resistance, the tensile elongation is preferably 100% or less.

A loom such as an air jet loom, rapier loom, projectile loom, or multiphase loom can be used for the production of the patch cloth, but is not limited thereto. A ring temple or a full temple can be used during weaving. The weave structure of the patch cloth is not particularly limited, and a plain weave, 2/2 diagonal weave, 3/3 diagonal weave, 2/1 diagonal weave, twill weave, or ripstop can be used, and these structures can be combined. Both sides or one side of the patch cloth may be coated with an elastomer or thermoplastic resin, or laminated with a film or another coating material. In order to improve cut resistance, multiple patch cloths may be layered or combined with other fabric cloths.

EXAMPLES

Next, the embodiments of the present disclosure will be specifically described by means of Examples and Comparative examples, but the present disclosure is not limited to only these Examples. Note that the measurement methods and evaluations methods used are as described below.

(1) Fineness

Fineness is measured in accordance with the method for measuring the apparent fineness of yarns taken from a texture described in JIS L 1096:2010 Annex H (method A). However, the load when measuring the straight length of the yarn is set to 9.3 mN/tex, 20 continuous yarns are measured for each of the warp and weft yarns, and the average values thereof are recorded.

(2) Basis Weight, Density, and Thickness

Basis weight: Five 100 mm×100 mm samples are collected and measured in accordance with method B (ISO method) for measuring mass per unit area under standard conditions described in JIS L 1096:2010. The basis weight of each sample is measured, and the average value thereof is obtained.

Density: In accordance with the woven fabric density method A described in JIS L 1096:2010, five 2.54 cm square samples are collected, the number of yarns constituting each sample is counted with an optical microscope, and the average value thereof is calculated.

Thickness: Five 100 mm×100 mm samples are taken and measured in accordance with thickness method B described in JIS L 1096:2010. The applied pressure is 1 kPa, and a presser foot with a diameter of 10.5 mm is used. The thickness of each sample is measured, and the average value thereof is obtained.

However, if the dimensions of the test sample are insufficient for the measurement of the basis weight, density, and thickness above, the widest possible range of samples may be taken and measured.

(3) Cover Factor

The cover factors are calculated using the following respective formulas.

Warp: $CF_x = (D_x \times \sqrt{F_x})$

Weft: $CF_y = (D_y \times \sqrt{F_y})$

Warp-Weft ratio: $CF_x/CF_y$ or $CF_y/CF_x$, whichever is smaller

Warp-Weft total: $CF_x + CF_y$ where $D_x$ is a warp yarn number (warp yarn density) per 2.54 cm, $F_x$ is a fineness (dtex) of the warp constituting the woven fabric, $D_y$ is a weft yarn number (weft yarn density) per 2.54 cm, and $F_y$ is a fineness (dtex) of the weft constituting the woven fabric.

(4) Tensile Elongation, Tear Strength

Tensile elongation and tear strength are measured in accordance with the following method described in JIS L 1096:2010. Regarding tear strength, the warp-weft ratio is calculated by dividing the smaller by the larger.

Tensile elongation: Tensile strength and elongation rate in method A (strip method)

Tear strength: Tear strength method A (single tongue method)

(5) Bending Resistance

Bending resistance is measured in accordance with the method described in ASTM D4032-08 (2016).

(6) Edge-comb Resistance

Edge-comb resistance is measured in accordance with the method described in ASTM D6479.

(7) Dynamic Tear Lengths $T_x$, $T_y$

Dynamic tear length is measured in accordance with the material puncture and dynamic tear resistance test described in JIS T 8050:2005. The mass of the blade-holding block and the blade is 1000 g, the kinetic energy of the block and the blade calculated from the average speed when the block is dropped five times in succession is adjusted to 6.6 to 7.0 J, and the value at this time is recorded as the kinetic energy E (J). A sample is cut with scissors so that the swollen part of the double hollow weave structure is located at the center of the sample (the puncture and tearing part of the blade), and the sample is affixed to a sample mounting block so that the resin-coated surface is on the outside. The test is performed on at least three samples in each of the warp direction and the weft direction, and the average tear lengths in each direction are calculated as $T_x$ and $T_y$. Furthermore, the warp-weft ratio is obtained by dividing the smaller by the larger.

(8) Dynamic Tear Properties $P_x$, $P_y$ $$P_x = E/(T_x \times F_x) \times 1000$$

$$P_y = E/(T_y \times F_y) \times 1000$$

where E is the kinetic energy (J) of the block and blade in the dynamic tear test (performance standard level 3) described in JIS T 8050, $T_x$ is an average value (mm) of a warp direction tear length in the dynamic tear test (performance standard level 3) described in JIS T 8050, $F_x$ is a fineness (dtex) of a warp constituting the woven fabric, $T_y$ is an average value (mm) of a weft direction tear length in the dynamic tear test (performance standard level 3) described in JIS T 8050, and $F_y$ is a fineness (dtex) of a weft constituting the woven fabric.

(9) Packability (Roll Diameter)

Figure 1:
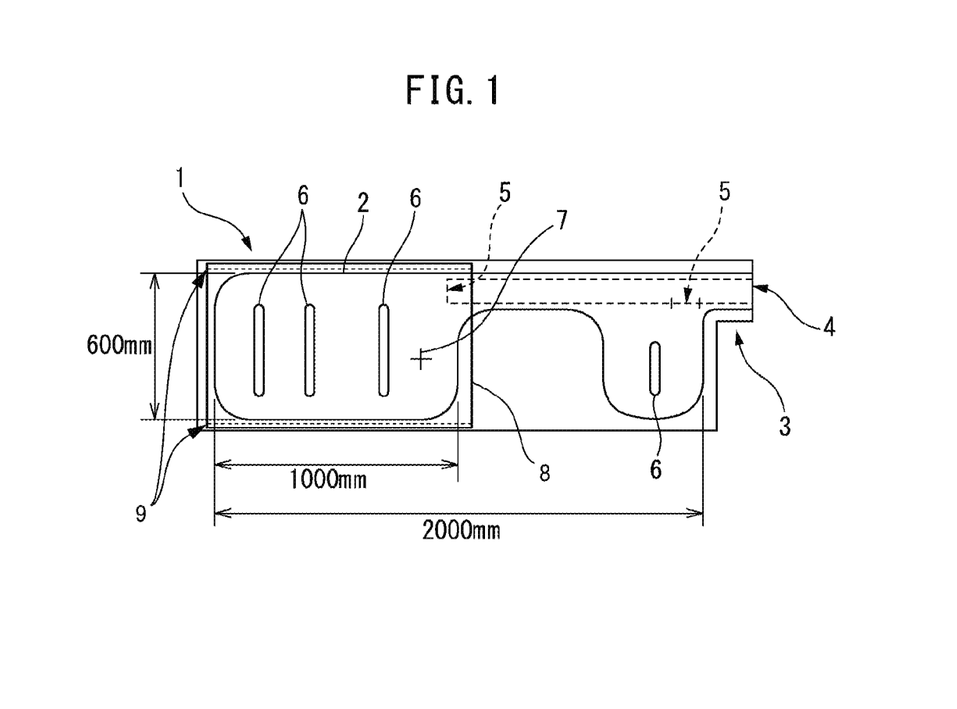
FIG. 1 is a schematic view of a curtain airbag (curtain airbag module) to which a patch cloth is attached.

A side curtain airbag (1) with a patch cloth (8) having the shape shown in FIG. 1 is produced by the following procedure. Using, as the warp and weft yarns, nylon 66 fibers having a total fineness of 235 dtex, a raw yarn strength of 8.5 cN/dtex, and a hot water dimensional change rate of 8.0%, a curtain airbag body cloth having a capacity of 24 L is woven in the shape shown in FIG. 1 using an electronic jacquard device and a rapier loom. Next, both sides of this texture are coated with 80 g/m² of a liquid silicone composition and heat-treated in a dryer at 180° C. for 1 minute. The weave structure of the binding part that binds the bag changes in the order of hollow weave, 2/2 basket (4 yarns), hollow weave (including 4 basket yarns), 3/3 basket (6 yarns), and hollow weave. The weave structure of the double woven part is a plain weave, and approximately 1% of the double weave of the hollow weave is partially knotted in the portion which does not expand outside the knotted part of the bag. As shown in FIG. 1, a patch cloth is affixed to the airbag body cloth by sewing the upper and lower sewing parts (9) so that the patch cloth covers one side of the portion indicated by the vertical length of 600 mm and the horizontal length of 1000 mm of the airbag. The resulting curtain airbag having a patch cloth is wound vertically into a roll and secured with a tape. At this time, the circumference of the roll is measured at five points with a tape measure, and the roll diameter is calculated by dividing the average value by the circumference ratio. A roll diameter of less than 22 mm is evaluated as A, a roll diameter of 22 mm or more and less than 25 mm is evaluated as B, a roll diameter of 25 mm or more and less than 28 mm is evaluated as C, and a roll diameter of 28 mm or more is evaluated as D.

(10) Glass Cut, Internal Pressure at Time of Deployment

Figure 2:
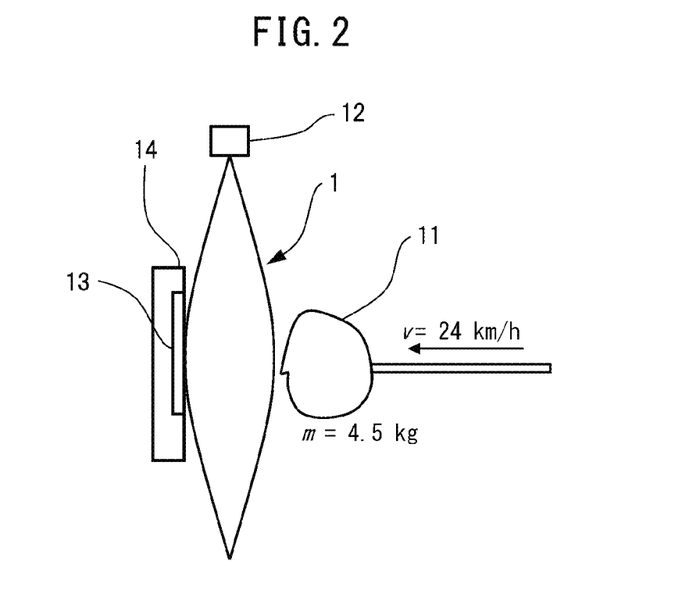
FIG. 2 is a schematic view for detailing an internal pressure test during glass cut development.

A side curtain airbag (1) having a patch cloth (8) having the shape shown in FIG. 1 is wound vertically into a roll and secured with a tape. A 2.0 mol hybrid inflator is attached to the inflator attachment part (3) to form a curtain airbag module. An impactor test is performed using this module. Specifically, as schematically shown in FIG. 2, the collision behavior of an actual vehicle is simulated by collision with an object referred to as an impactor head (11) under the following conditions in accordance with the deployment of the airbag module. A 4.5 kg impactor head is used, and the head speed is 24 km/h. The impact timing is 30 milliseconds after the operation of the inflator, and the impact point is the portion (7: central portion of the protected area) marked with a plus in FIG. 1 of the time of airbag deployment. A board (14) is installed on the opposite side of the impactor head with respect to the module position so as to follow the deployment of the airbag, and a rasp cut file (13) (flat type, coarseness: 10 ridges/cm², length: 250 mm×width: 25 mm, thickness: 6 mm) manufactured by Tsubosan Co., Ltd., is vertically attached to the impact point as a jig imitating a piece of glass. The file is positioned such that the center of the file is at the impact point, the rasp side of the file faces a cushion contact surface, and the file is affixed so that the surface of the file (valleys) and the surface of the board are coplanar. The measurement of the internal pressure during deployment is taken as the portion marked with a plus in FIG. 1 of the time of airbag deployment. The impactor test is carried out according to the normal procedure, and the internal pressure of the cushion 1000 milliseconds after deployment is rated A when it is 30 kPa or more, B when it is 25 kPa or more and less than 30 kPa, C when it is 15 kPa or more and less than 25 kPa, and D when it is less than 15 kPa.

(11) Slippage of Sewing Part

After conducting the test of (10), the degree of slippage of the sewn parts of the patch cloth and the airbag body cloth is evaluated in three stages. The case where no damage is observed is rated B, the case where the weave of the patch cloth is loose and there is partial slippage is rated C, and the case where the patch cloth partially separates from the airbag body cloth is rated D.

(12) Overall Score

In the results of (9) to (11), A is 3 points, B is 2 points, C is 1 point, and D is 0 points, and the product of the scores for each item is expressed as the overall score.

Example 1

Using, as the warp and weft yarns, nylon 66 fibers having a raw yarn strength of 8.5 cN/dtex and a hot water dimensional change rate of 8.0%, a plain weave woven fabric was woven using a water jet loom with a smaller number of weft insertions than the warp yarn density. The texture was then washed with hot water at 80° C. and dried with a cylinder roller. The total fineness of the fibers constituting this woven fabric was 205 dtex. The warp and weft densities and woven fabric properties of the woven fabric obtained in Example 1 are shown in Table 1.

Examples 2 to 4 and Comparative Example 1

Using, as the warp and weft yarns, nylon 66 fibers having a raw yarn strength of 8.5 cN/dtex and a hot water dimensional change rate of 8.0%, plain weave woven fabrics were woven using a water jet loom with a smaller number of weft insertions than the warp yarn density. The textures were then washed with hot water at 80° C. and dried with a cylinder roller. The total fineness of the fibers constituting these woven fabrics were 235 dtex. The warp and weft densities and woven fabric properties of the woven fabrics obtained in Examples 2 to 4 and Comparative Example 1 are shown in Table 1.

Examples 5 and 6 and Comparative Examples 2, 4, and 5

Using, as the warp and weft yarns, nylon 66 fibers having a raw yarn strength of 8.5 cN/dtex and a hot water dimensional change rate of 8.0%, plain weave woven fabrics were woven using a water jet loom with a smaller number of weft insertions than the warp yarn density. The textures were then washed with hot water at 80° C. and dried with a cylinder roller. The total fineness of the fibers constituting these woven fabrics were 470 dtex. The warp and weft densities and woven fabric properties of the woven fabrics obtained in Examples 5 and 6 and Comparative Examples 2, 4, and 5 are shown in Table 1.

Comparative Example 3

Using, as the warp and weft yarns, nylon 66 fibers having a raw yarn strength of 8.5 cN/dtex and a hot water dimensional change rate of 8.0%, a plain weave woven fabric was woven using a water jet loom with a number of weft insertions equal to the warp yarn density. The texture was then washed with hot water at 80° C. and dried with a cylinder roller. The total fineness of the fibers constituting this woven fabric was 700 dtex. The warp and weft densities and woven fabric properties of the obtained woven fabric are shown in Table 1.

Example 7

The woven fabric obtained in Example 1 was sewn onto one side of the curtain airbag body cloth obtained in the section regarding the production of a curtain airbag body cloth, using a 1400 dtex sewing thread at a stich number of 45 stitches/10 cm with one row of lockstitches at the positions shown in FIG. 1 to produce a patch cloth. At this time, the patch cloth was attached so that the warp or weft direction thereof, whichever had the smaller cover factor (weft direction), was parallel to the deployment direction of the airbag. An inner tube was inserted into the curtain airbag having the patch cloth as indicated by reference numeral 4 in FIG. 1 to guide the deployment gas from the gas supply port at the rear end to the front expansion part and the rear expansion part. As the inner tube was used a 25 g/m² silicone-coated plain weave fabric of polyamide 6/6 fiber 700 dtex/105 f as the warp and weft yarns of 41×41/2.54 cm. This cloth was bias-stitched into a cylindrical shape with a diameter that allows the gas supply port to be inserted therein. Sewing was performed with a 1400 dtex sewing thread and a single line of lockstitching at a stitch number of 45 stitches/10 cm. The tip of the inner tube served as the opening, the sewn part was on the upper side, and the gas supply cutout of the rear expansion part was on the lower side. The properties of the obtained curtain airbag are as shown in Table 2, and the curtain airbag had excellent storage properties, normal cut resistance during deployment, and no slipping of the sewn part.

Example 8

Using the woven fabric obtained in Example 2, curtain airbag evaluation was performed by the same method as Example 7. The properties of the obtained curtain airbag are as shown in Table 2, it had excellent packability, normal cut resistance during deployment, and no slipping of the sewn part.

Example 9

Using the woven fabric obtained in Example 3, curtain airbag evaluation was performed by the same method as Example 7. The properties of the obtained curtain airbag are as shown in Table 2, it had excellent packability, good cut resistance during deployment, and no slipping of the sewn part.

Example 10

Using the woven fabric obtained in Example 4, curtain airbag evaluation was performed by the same method as Example 7. The properties of the obtained curtain airbag are as shown in Table 2, it had excellent packability, good cut resistance during deployment, and no slipping of the sewn part.

TABLE 1

| Measurement item | | | Ex 1 | Ex 2 | Ex 3 | Ex 4 | Ex 5 | Ex 6 | Comp Ex 1 | Comp Ex 2 | Comp Ex 3 | Comp Ex 4 | Comp Ex 5 |
|---|---|---|---|---|---|---|---|---|---|---|---|---|---|
| Fineness | — | dtex | 205 | 235 | 235 | 235 | 470 | 470 | 235 | 470 | 700 | 470 | 470 |
| Density | Warp | yarns/in | 77 | 72 | 71 | 71 | 53 | 53 | 72 | 53 | 41 | 40 | 31 |
| | Weft | yarns/in | 54 | 65 | 55 | 49 | 37 | 26 | 72 | 53 | 41 | 40 | 31 |
| Cover factor | Warp | — | 1102 | 1104 | 1088 | 1088 | 1149 | 1149 | 1104 | 1149 | 1085 | 867 | 672 |
| | Weft | — | 773 | 996 | 843 | 751 | 800 | 564 | 1104 | 1149 | 1085 | 867 | 672 |
| | Warp-Weft Ratio | — | 0.70 | 0.90 | 0.77 | 0.69 | 0.70 | 0.49 | 1.00 | 1.00 | 1.00 | 1.00 | 1.00 |
| | Warp-Weft Total | — | 1876 | 2100 | 1932 | 1840 | 1949 | 1713 | 2207 | 2298 | 2170 | 1734 | 1344 |
| Basis weight | — | g/m² | 112 | 134 | 122 | 111 | 180 | 160 | 143 | 219 | 250 | 165 | 151 |
| Thickness | — | mm | 0.14 | 0.20 | 0.18 | 0.18 | 0.29 | 0.27 | 0.22 | 0.34 | 0.37 | 0.29 | 0.27 |
| Tensile elongation | Warp | % | 27.4 | 32.7 | 28.9 | 26.7 | 31.3 | 28.0 | 37.8 | 38.8 | 39.4 | 33.8 | 31.8 |
| | Weft | % | 25.9 | 31.8 | 26.9 | 24.0 | 29.6 | 29.7 | 28.2 | 27.6 | 35.3 | 27.6 | 27.6 |
| Tear strength | Warp | N | 110 | 107 | 119 | 140 | 257 | 363 | 95 | 170 | 256 | 252 | 260 |
| | Weft | N | 88 | 100 | 106 | 111 | 204 | 317 | 98 | 179 | 266 | 265 | 267 |
| | Warp-Weft Ratio | — | 0.80 | 0.93 | 0.89 | 0.79 | 0.79 | 0.87 | 0.97 | 0.95 | 0.96 | 0.95 | 0.97 |
| Bending resistance | Warp | N | 3 | 5 | 4 | 2 | 7 | 3 | 11 | 21 | 16 | 11 | 3 |
| | Weft | N | 3 | 6 | 4 | 3 | 7 | 3 | 11 | 23 | 21 | 12 | 4 |
| Edge-comb resistance | Warp | N | 90 | 358 | 250 | 120 | 114 | 21 | 490 | 738 | 316 | 31 | 8 |
| | Weft | N | 61 | 347 | 194 | 66 | 97 | 16 | 488 | 687 | 261 | 25 | 7 |
| Dynamic tear length | Warp ($T_x$) | mm | 42.1 | 37.9 | 37.8 | 37.1 | 21.7 | 24.0 | 41.1 | 21.0 | 13.7 | 19.7 | 23.5 |
| | Weft ($T_y$) | mm | 38.0 | 35.6 | 32.8 | 30.2 | 15.7 | 11.8 | 40.8 | 21.5 | 13.3 | 19.8 | 24.1 |
| | Warp-Weft Ratio | — | 0.90 | 0.94 | 0.87 | 0.81 | 0.72 | 0.49 | 0.99 | 0.98 | 0.97 | 0.99 | 0.98 |
| Dynamic tear properties | Warp ($P_x$) | — | 0.80 | 0.77 | 0.78 | 0.79 | 0.68 | 0.61 | 0.71 | 0.70 | 0.72 | 0.75 | 0.62 |
| | Weft ($P_y$) | — | 0.89 | 0.82 | 0.90 | 0.97 | 0.94 | 1.24 | 0.72 | 0.68 | 0.74 | 0.74 | 0.61 |
| | Max | — | 0.89 | 0.82 | 0.90 | 0.97 | 0.94 | 1.24 | 0.72 | 0.70 | 0.74 | 0.75 | 0.62 |

Example 11

Using the woven fabric obtained in Example 5, curtain airbag evaluation was performed by the same method as Example 7. The properties of the obtained curtain airbag are as shown in Table 2, it had excellent packability, very good cut resistance during deployment, and no slipping of the sewn part.

Example 12

Using the woven fabric obtained in Example 6, curtain airbag evaluation was performed by the same method as Example 7. The properties of the obtained curtain airbag are as shown in Table 2, though the weave of the patch cloth loosened and partial slippage occurred, it had excellent packability and vert good cut resistance during deployment.

Comparative Example 6

Using the woven fabric obtained in Comparative Example 1, curtain airbag evaluation was performed by the same method as Example 7. The properties of the obtained curtain airbag are as shown in Table 2, and though it had excellent packability and no slippage of the sewn part, it had poor cut resistance during deployment.

Comparative Example 7

Using the woven fabric obtained in Comparative Example 2, curtain airbag evaluation was performed by the same method as Example 7. The properties of the obtained curtain airbag are as shown in Table 2, and though the cut resistance during deployment was normal and there was no slippage of the sewn part, the packability was poor.

Comparative Example 8

Using the woven fabric obtained in Comparative Example 3, curtain airbag evaluation was performed by the same method as Example 7. The properties of the obtained curtain airbag are as shown in Table 2, and though the cut resistance during deployment was very good and there was no slippage of the sewn part, the packability was poor.

Comparative Example 9

Using the woven fabric obtained in Comparative Example 4, curtain airbag evaluation was performed by the same method as Example 7. The properties of the obtained curtain airbag are as shown in Table 2, and though there was no slippage of the sewn part, both packability and cut resistance during deployment were normal.

Comparative Example 10

Using the woven fabric obtained in Comparative Example 5, curtain airbag evaluation was performed by the same method as Example 7. The properties of the obtained curtain airbag are as shown in Table 2, and though the packability was excellent, the property during deployment was normal and there was slippage of the sewn part.

Example 11

Using the woven fabric obtained in Example 5, curtain airbag evaluation was performed by the same method as Example 7. However, when attaching the patch cloth to the airbag body cloth, the patch cloth was attached so that the warp or weft direction thereof, whichever had the larger cover factor (vertical direction), was parallel to the deployment direction of the airbag. The properties of the obtained curtain airbag are as shown in Table 2, the storage and cut resistance during deployment were normal, and there was no slippage of the sewn part.

TABLE 2

| Measurement item | | Ex 7 | Ex 8 | Ex 9 | Ex 10 | Ex 11 | Ex 12 | Comp Ex 6 | Comp Ex 7 | Comp Ex 8 | Comp Ex 9 | Comp Ex 10 | Ex 13 |
|---|---|---|---|---|---|---|---|---|---|---|---|---|---|
| Patch cloth used | | Ex 1 | Ex 2 | Ex 3 | Ex 4 | Ex 5 | Ex 6 | Comp Ex 1 | Comp Ex 2 | Comp Ex 3 | Comp Ex 4 | Comp Ex 5 | Ex 5 |
| Patch cloth attachment direction | | Warp direction | Warp direction | Warp direction | Warp direction | Warp direction | Warp direction | Warp direction | Warp direction | Warp direction | Warp direction | Warp direction | Weft direction |
| Roll diameter | mm | 19.9 | 21.9 | 21.2 | 20.3 | 24.6 | 22.9 | 24.2 | 28.2 | 31.3 | 25.1 | 22.9 | 25.7 |
| | Rank | A | A | A | A | B | B | B | D | D | C | B | C |
| Glass cut, internal pressure during deployment | kPa | 15.0 | 21.3 | 26.2 | 37.3 | 31.2 | 42.0 | 9.1 | 19.4 | 42.1 | 19.9 | 16.9 | 22.1 |
| | Rank | C | C | B | B | A | A | D | C | A | C | C | C |
| Sewn part slippage | Rank | B | B | B | B | B | C | B | B | B | C | D | B |
| Overall score | — | 6 | 6 | 12 | 12 | 12 | 6 | 0 | 0 | 0 | 1 | 0 | 2 |

INDUSTRIAL APPLICABILITY

By attaching the airbag patch cloth of the present disclosure to the body cloth of an airbag, an airbag which has excellent packability and excellent cut resistance when the airbag is deployed can be provided. In particular, the airbag patch cloth of the present disclosure can be suitably used for a curtain airbag which protects a human body from the side.

DESCRIPTION OF REFERENCE SIGNS

1 side curtain airbag
2 seam (bag boundary)
3 inflator attachment part
4 inner tube
5 aperture
6 joint
7 protected area center
8 patch cloth
9 sewn part between patch cloth and airbag body cloth
11 impactor head
12 side curtain airbag mounting part 13 file
14 boards

The invention claimed is:

1. An airbag patch cloth for attachment to a body cloth of an airbag, wherein
the airbag patch cloth is a woven fabric, and
in the woven fabric, at least one of dynamic tear properties $P_x$ and $P_y$ represented by the following formulas is 0.8 or more:

$$P_x = E/(T_x \times F_x) \times 1000$$

$$P_y = E/(T_y \times F_y) \times 1000$$

where E is a kinetic energy (J) of a block and blade in the dynamic tear test (performance standard level 3) described in JIS T 8050, $T_x$ is an average value (mm) of a warp direction tear length in the dynamic tear test (performance standard level 3) described in JIS T 8050, $F_x$ is a fineness (dtex) of a warp constituting the woven fabric, $T_y$ is an average value (mm) of a weft direction tear length in the dynamic tear test (performance standard level 3) described in JIS T 8050, and $F_y$ is a fineness (dtex) of a weft constituting the woven fabric.

2. The airbag patch cloth according to claim 1, wherein a ratio of $T_x$ and $T_y$ of the airbag patch cloth when the smaller of $T_x$ and $T_y$ is divided by the larger is 0.94 or less.

3. The airbag patch cloth according to claim 1, wherein in the airbag patch cloth, a ratio of a warp cover factor $CF_x$ and a weft cover factor $CF_y$ represented by the following formulas, when the smaller of $CF_x$ and $CF_y$ is divided by the larger, is 0.30 to 0.80:

$$CF_x = (D_x \times \sqrt{F_x})$$

$$CF_y = (D_y \times \sqrt{F_y})$$

where $D_x$ is a warp yarn number (warp yarn density) per 2.54 cm, $F_x$ is a fineness (dtex) of the warp constituting the woven fabric, $D_y$ is a weft yarn number (weft yarn density) per 2.54 cm, and $F_y$ is a fineness (dtex) of the weft constituting the woven fabric.

4. The airbag patch cloth according to claim 1, wherein a sum of a warp cover factor $CF_x$ and a weft cover factor $CF_y$ of the airbag patch cloth is 1500 to 2200.

5. The airbag patch cloth according to claim 1, wherein a total fineness of warp and yarns constituting the airbag patch cloth is 210 dtex to 550 dtex.

6. The airbag patch cloth according to claim 1, wherein an edge-comb resistance of the airbag patch cloth is 10 N to 400 N for both warp and weft.

7. The airbag patch cloth according to claim 1, wherein a basis weight of the airbag patch cloth is 220 g/m² or less.

8. The airbag patch cloth according to claim 1, wherein a warp-weft ratio of tear strength of the airbag patch cloth is 0.94 or less when the smaller of the warp direction tear strength and the weft direction tear strength is divided by the larger.

9. The airbag patch cloth according to claim 1, wherein a warp and/or weft direction tear strength of the airbag patch cloth is 100 N or more.

10. The airbag patch cloth according to claim 1, wherein a warp and/or weft direction bending resistance of the airbag patch cloth is 10 N or less.

11. The airbag patch cloth according to claim 1, wherein a warp and/or weft direction tensile elongation of the airbag patch cloth is 10% or more.

12. An airbag, to which the airbag patch cloth according to claim 1 is attached so as to cover at least a part of an airbag body cloth.

13. The airbag according to claim 12, wherein the airbag patch cloth is attached so that the warp or weft direction of the airbag patch cloth, whichever has the smaller cover factor, is parallel to a deployment direction of the airbag.

* * * * *